United States Patent [19]

Cocito et al.

[11] Patent Number: 4,740,225
[45] Date of Patent: Apr. 26, 1988

[54] METHOD OF PRODUCING OPTICAL FIBERS WITH NONCIRCULAR CORE

[75] Inventors: Giuseppe Cocito, S. Giusto Can. Se; Giorgio Grego, Venaria; Eros Modone, Turin, all of Italy

[73] Assignee: Cselt-Centro Studi E Laboratori Telecomunicazioni SpA, Torino, Italy

[21] Appl. No.: 922,317

[22] Filed: Oct. 23, 1986

[30] Foreign Application Priority Data

Oct. 29, 1985 [IT] Italy ................... 67911 A/85

[51] Int. Cl.⁴ .................... C03B 37/025; G02B 5/14
[52] U.S. Cl. ........................... 65/3.12; 65/13; 65/18.2; 350/96.33; 427/163
[58] Field of Search ............. 65/2, 3.11, 3.12, 13, 65/18.2; 427/163; 350/96.33

[56] References Cited

U.S. PATENT DOCUMENTS

| | | | |
|---|---|---|---|
| 3,982,916 | 9/1976 | Miller | 65/3.12 |
| 4,360,371 | 11/1982 | Blankenship et al. | 65/3.12 |
| 4,395,270 | 7/1983 | Blankenship et al. | 65/3.12 |
| 4,528,009 | 7/1985 | Sarkar | 65/3.12 |
| 4,578,097 | 3/1986 | Berkey | 65/3.11 |

FOREIGN PATENT DOCUMENTS

| | | | |
|---|---|---|---|
| 2930791 | 2/1981 | Fed. Rep. of Germany | 65/3.11 |
| 0134743 | 8/1984 | France . | |
| 1229528 | 4/1971 | United Kingdom | 65/13 |
| 2012983 | 1/1979 | United Kingdom . | |

OTHER PUBLICATIONS

Conference Proceedings Ecoc '84, pp. 202, 203; Sep. 3–6, 1984, Romaniuk et al.

Primary Examiner—Robert L. Lindsay
Attorney, Agent, or Firm—Karl F. Ross; Herbert Dubno

[57] ABSTRACT

A method of making optical performs from which optical fibers are drawn after collapsing of the preform, which comprises depositing by a vapor-phase reaction a plurality of layers on the inner surface of a support tube and controlling the temperature profile around the perimeter of the support so that the thickness of the deposit varies between at least one maximum and at least one minimum. Upon collapse of the support this gives rise to a core having a noncircular cross section.

19 Claims, 2 Drawing Sheets

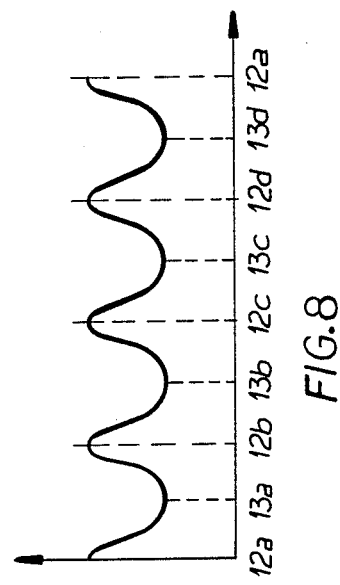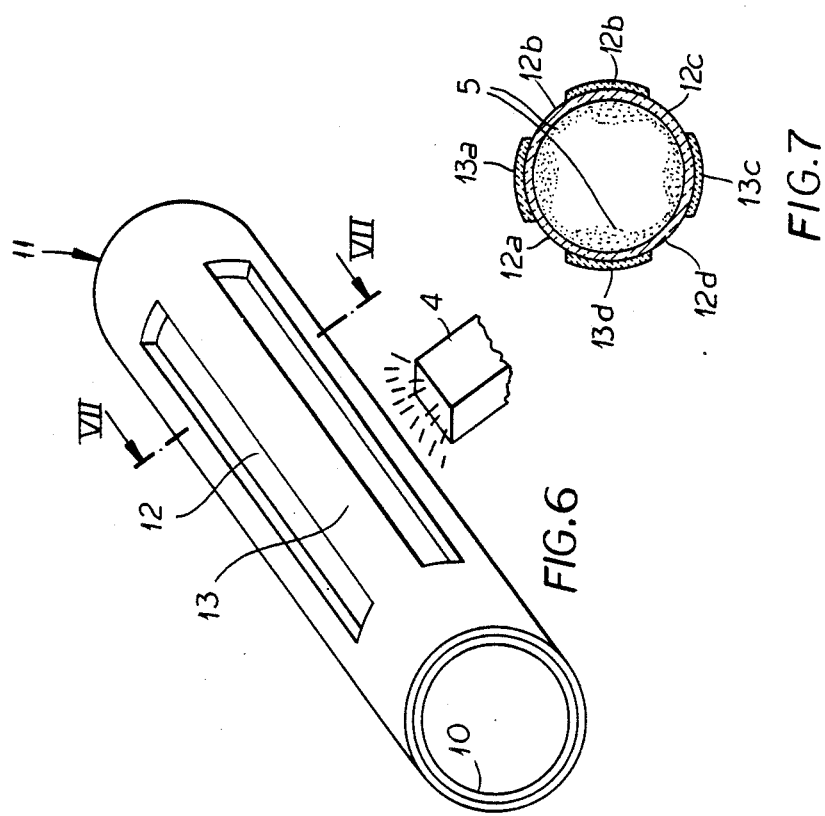

METHOD OF PRODUCING OPTICAL FIBERS WITH NONCIRCULAR CORE

FIELD OF THE INVENTION

Our present invention relates to a method of producing optical fibers and, more particularly to a method of producing an optical fiber with a noncircular core, i.e. with a core whose cross section is noncircular.

BACKGROUND OF THE INVENTION

Optical fibers whose cores have noncircular cross sections are used, for example, in sensors and couplers of various types, in polarization-maintaining fibers for coherent optical communication systems, and are of interest because such systems allow higher spacing between repeaters than other kinds of fibers.

Heretofore, fibers with noncircular core cross section could be obtained, in the case of simple geometrical shapes such as elliptical core fibers, by mechanical deformation of a preform with an originally circular core. Mechanical deformation, however, can give rise to problems of mechanical strength and constancy of optical characteristics of the fiber with time or upon subjection of the fiber to various thermal effects.

In the case of more complex shapes and for multicore fibers, where the noncircular core is produced without mechanical deformation or in conjunction with mechanical deformation, the apparatus which has been required to fabricate such fibers has been very complex. For example, the apparatus may require a drawing furnace divided into a plurality of thermally insulated sections with independently adjustable temperature (see the paper entitled *Coupled/Noncoupled Wave Transmission in Long-Length Multicore Optical Fibers,* R. S. Romanyuk and J. Dorosz, ECOC '84, Stuttgart, Sept. 3–6 1984).

OBJECTS OF THE INVENTION

It is the principal object of the present invention to provide an improved method of making noncircular core optical fibers whereby the drawbacks outlined above are obviated.

Another object of our invention is to provide an improved method of making noncircular core optical fibers which does not require mechanical deformation of the fibers.

A further object of the invention is to produce noncircular core fibers without the need for complex apparatus and which can be implemented in conventional fabrication facilities using the principles of chemical vapor deposition (CVD) of the materials to form at least the core of the fiber.

SUMMARY OF THE INVENTION

These objects and others which become apparent hereinafter are attained, in accordance with the invention, by collapsing and drawing a preform fabricated by the deposition of a succession of layers of the material forming the cladding and the core of the fiber on the inner surface of a support, usually a tube of silica, and wherein the deposition of this material is obtained by high-temperature synthesis from gas-phase reactants.

According to the invention, the layers are deposited with a thickness variation along the perimeter of any cross section of the support between at least one maximum and one minimum, the nonuniform thickness being generated by intentional temperature nonuniformity along the perimeter of the heated section at which vitreous material synthesis and deposition are carried out. More particularly, the method of producing optical fibers with a noncircular core of the invention, comprise the steps of:

(a) producing a preform by depositing on the surface of a preform support a plurality of layers of a vitrifiable material, each generated by high-temperature synthesis from vapor-phase reactants;

(b) maintaining a temperature profile perimetrically around the support so that the layers are deposited in a thickness which varies in a predetermined pattern around the perimeter of the support between at least one maximum and at least one minimum and results from a temperature distribution generally continuously varying between at least one minimum to at least one maximum in inverse correspondence to the predetermined thickness variation pattern;

(c) collapsing the preform with the layers thereon in the predetermined thickness variation pattern; and (d) drawing an optical fiber from the collapsed preform.

Generally the deposited layers will have along the deposition annulus as it progresses the support axially, a succession of thickness maxima and minima, respectively, due to a corresponding succession of temperature minima and maxima.

Obviously, the method as described is clearly applicable to classical CVD internal processes, in which the deposits are formed on the inner surface of a tube of silica which ultimately will form the glass sheath surrounding the cladding and the core.

The intentional generation of the temperature variation along the perimeter may be due to various effects such as the noncircular shape or nonuniform thickness of the reaction tube cross section.

Preferably the support has different dimensions along two mutually perpendicular axes.

The tube shape can be maintained constant during deposition or can be varied by regulation of the pressure inside the tube. Tubes with circular internal section and polygonal external section, or vice versa, can be used.

Another approach within the present invention for intentionally generating the varying thermal profile around the perimeter of the support, as distinct from exploiting the support tube shape, involves the use of a conventional cylindrical tube arranged inside a refractory screen consisting of a zirconia tube having one or more longitudinal slits defining temperature maxima.

The masking or shielding tube thus controls the temperature since the temperature profile between temperature maxima will depend on slit width and the shape and thickness of the screen sectors between slits.

Of course both approaches can be combined, i.e. a shielding or screening tube with slits can be used in conjunction with support tubes of noncircular cross section.

BRIEF DESCRIPTION OF THE DRAWING

The above and other objects, features and advantages of the present invention will become more readily apparent from the following description, reference being made to the accompanying drawing in which:

FIG. 6 is a perspective view showing an apparatus similar to that of FIG. 1 but utilizing a screen;

FIG. 7 is a cross sectional view taken along the line VII—VII of FIG. 6; and

FIG. 8 is a graph of the temperature profile along the perimeter of the cross section of FIG. 7.

SPECIFIC DESCRIPTION

Figure 1:
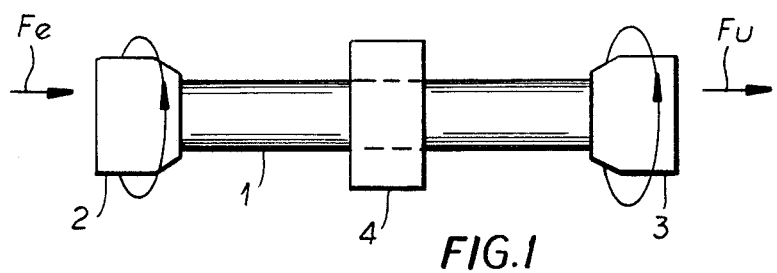
FIG. 1 is a diagrammatic elevational view of a portion of an apparatus for producing optical fiber preforms by the deposition of the vitreous material inside a reaction tube of noncircular glass section.

As shown in FIG. 1, a silica reaction tube 1 is mounted on a lathe of a conventional optical-fiber preform manufacturing system utilizing the inside vapor phase oxidation (IPVO) technique, the tube being intended to form a support for a succession of layers of nonuniform thickness which will ultimately, upon collapse of the preform and drawing of the fiber, form a cladding and a core of noncircular cross section. The silica tube ultimately forms the sheathe or covering around this cladding and core. The lathe is diagrammatically represented by mandrels 2 and 3. A reactant inlet $F_e$ is provided at one end of this tube which can have a furnace 4 in the form of a heating element with respect to which the tube can move axially or which can move axially relative to the tube to sustain a vapor phase reaction generating the vitreous material of the deposit.

Gaseous reaction products and any carrier gas is conducted away as represented by the arrow $F_u$.

Vitreous material deposition inside the reaction tube takes place as promoted by the heating element 4 which faces only a short length of the surface of tube 1 and, as noted, can slowly move axially along the tube which is rotated by the mandrels about its axis. After the deposition of each layer, the heating element 4 returns to its original position, whereupon the reactants may be changed and a successive layer deposited.

Figures 2, 3:
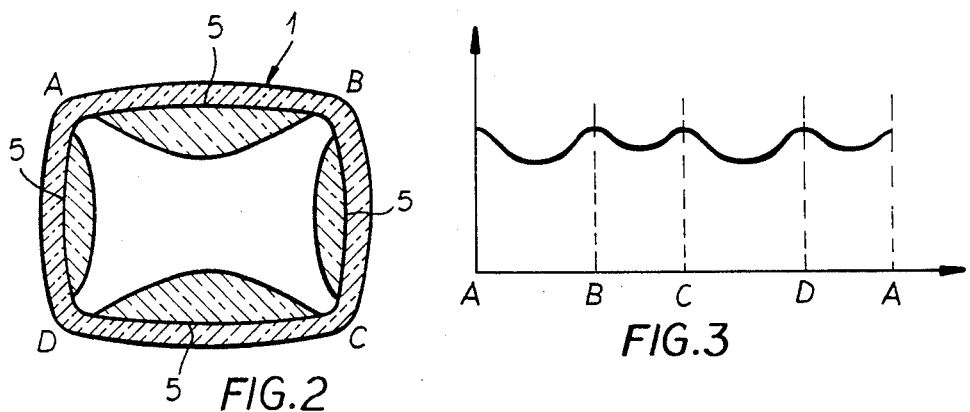
FIG. 2 is a cross section through this tube showing the deposited material.
FIG. 3 is a graph showing the temperature behavior or profile around the perimeter of the cross section of the support which as noted, has maxima and minima corresponding to the minima and maxima of the thickness of the deposited material, the temperature being plotted along the ordinate versus distance around the perimeter along the abscissa.

Tube 1 has a noncircular cross section, e.g. a rectangular cross section (FIG. 2). Because of the heating and rotation, the temperature distribution along the perimeter of any cross section of the tube will present a maximum at the vertices A, B, C and D, and a minimum substantially at the midpoint of each side.

As a consequence of such temperature distribution, the layers of material 3 depositing on the internal surfaces of tube 1 will have a thickness varying between a maximum at the central portions of the faces (where the temperature is a minimum) and a minimum in correspondence with the vertices (where the temperature is at a maximum). Thickness maxima on adjacent faces may be different (compare FIGS. 2 and 3).

Figures 4A, 4B, 4C, 4D:
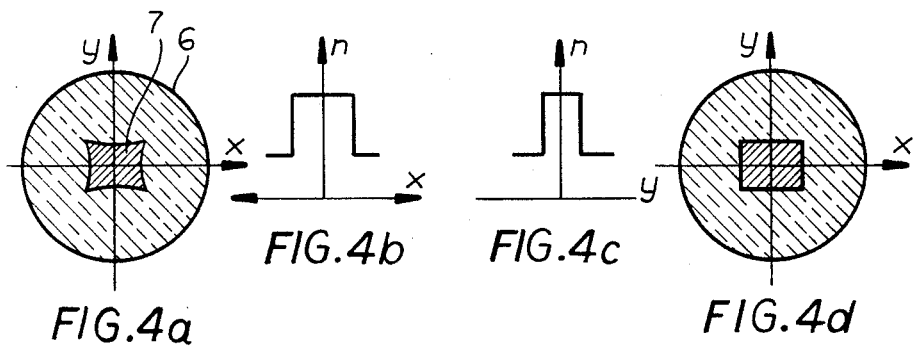
FIGS. 4a and 4d show cross sections after collapse while refractive index profiles are shown in FIGS. 4b and 4c.

Once the deposition has been completed, the preform is collapsed in the usual way. The collapsed preform has been shown in FIG. 4a where the circular cladding can be seen at 6 and the noncircular core at 7. The core maintains an approximately rectangular shape even after collapsing and a preform of the type shown in 4a will have a refractive index profile across the width of the profile, i.e. along the x axis as shown in FIG. 4b, i.e. a step profile. A similar step profile is found along the y axis (FIG. 4c). By suitably controlling the deposit, one can obtain a core cross section with substantially rectilinear sides as has been shown in FIG. 4d.

The preform is drawn into fibers in the usual way and the fiber which results will be found to be of a polarization-maintaining type as is well known from rectangular cross-section wave-guide theory.

Figures 5A, 5B, 5C, 5D, 5E, 5F, 5G, 5H, 5I, 5J:
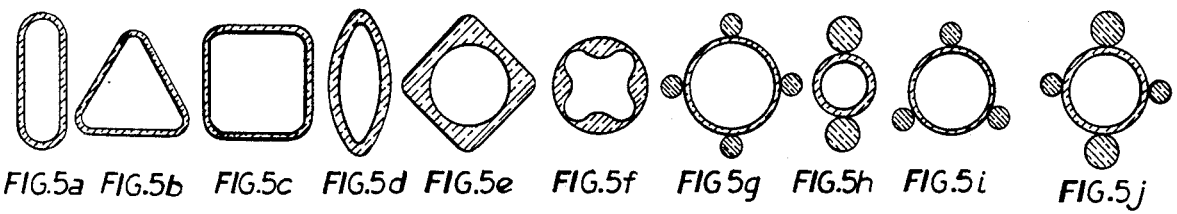
FIGS. 5a through 5j illustrate various proposed cross sections of the reaction tube.

FIGS. 5a–5j show other possible cross sections for the reaction tube. These include profiles with essentially constant thickness walls (FIGS. 5a–5d) as well as tubes whose walls vary in thickness along the section perimeter (FIGS. 5e and 5f). The variable wall thickness can also be obtained by starting with a tube of constant wall thickness and by placing at any stage in the process (initial, intermediate or final stage), two or more silica rods, even of different diameters, adjacent that tube and which, upon collapse of the tube, are incorporated into the walls to form thicker zones. This configuration is illustrated in FIGS. 5g, 5h, 5i and 5j. Other shapes, of course, either internal or external, can be used to control the temperature distribution and allow nonuniform thickness deposits to be formed.

The tube section can also be varied during deposition by acting on the internal pressure by pressure-adjusting means known in connection with such apparatus, the pressure being adjusted as a function of the shape and-/or diameter of the tube. Tubes whose cross sections have different dimensions along two mutually perpendicular axes, such as those of FIGS. 5a, 5d, 5h, are particularly suited for the production of polarization-maintaining fibers.

In the embodiment of FIG. 6, reaction tube 10 is a conventional cylindrical type, with circular cross section, but is arranged inside a shielding or screening tube 11 of refractory material, e.g. $ZrO_2$ (zirconia), resistant to high temperatures.

Tube 11 is formed with a plurality of slits 12 extending substantially over its entire length so that between these slits there are elements 13 which are joined at their ends. The number and the width of slits 12, as well as the shape and thickness of elements 13, determine the temperature distribution in tube 10.

FIG. 7 shows a tube with four slits 12a, 12b, 12c and 12d which separate shielding elements 13a, 13b, 13c and 13d from one another. As the tubes are rotated about their axis and heating is effected at 4, one obtains a temperature distribution of the type shown in FIG. 8 in which the temperature is plotted along the ordinate against the position around the perimeter along the abscissa and the axes of the slits and elements have been plotted as well. As can be seen from FIG. 8, the temperature minima coincide with the axes of the elements while the temperature maxima coincide with the slits so that the deposit 5 which is formed will be seen to have thickness maxima coinciding with the axes of the elements and thickness minima coinciding with the axes of the slits.

Of course, in order to obtain, within the screened tube, a deposit like that shown in FIG. 2, two opposite slits must be wider (and consequently, two opposite elements 13 must be narrower) than the other two. Obviously, a screen with a single slit could also be used. Moreover, screen 11 could comprise elements 13 with different thicknesses and/or shapes. In particular, the thicknesses of elements 13 determine the values of the temperature minima, and the shapes (in particular, edge inclination) determine the temperature behavior between adjacent maxima and minima.

We claim:

1. A method of producing optical fibers with a noncircular core, comprising the steps of:
   (a) producing a preform by internally depositing on an internal surface of a tubular preform support a plurality of layers of a vitrifiable material, each generated by high-temperature synthesis from vapor-phase reactants to form a core material;
   (b) maintaning a temperature profile perimetrally around said support so that the layers of said core material are deposited in a thickness which varies in a predetermined pattern around the perimeter of the support between at least one maximum and at least one minimum and results from a temperature distribution varying between at least one minimum to at least one maximum in inverse correspondence to the predetermined thickness variation pattern;
   (c) collapsing said preform with said layers thereon in said predetermined thickness variation pattern to a circular cross section body with a solid core of said core material in a noncircular cross sectional shape determined by said thickness variation pattern; and
   (d) drawing an optical fiber of circular outer cross section and noncircular core cross section from the collapsed preform body.

2. The method defined claim 1 wherein said temperature profile is selected so that said layers are deposited in a succession of thickness maxima alternating with thickness minima around the perimeter at each cross-section of said preform.

3. The method defined in claim 1 wherein said temperature profile is maintained in step b by hearing said support and forming said support with a noncircular cross-section.

4. The method defined in claim 3 wherein the cross section of said support has different dimensions along two mutually perpendicular axes.

5. The method defined in claim 1 wherein said support has a noncircular external cross section.

6. The method defined in claim 1 wherein said support has a noncircular internal cross section.

7. The method defined in claim 1 wherein said support has walls of constant wall thickness along the perimeter of any cross section thereof.

8. The method defined in claim 1 wherein said support varies in thickness around the perimeter of said support at any cross section thereof.

9. The method defined in claim 1, further comprising the step of positioning at least one rod along said tubular support and incorporating said rod with said tube upon heating.

10. The method defined in claim 9 wherein at least four rods, having two by two different cross-sectional size, are positioned along and incorporated with said tubular support.

11. The method defined in claim 3 wherein the temperature profile is maintained in step b by varying the tube section shape by acting on the pressure inside said tubular support.

12. The method defined in claim 1 wherein the temperature profile is maintained in step b by interposing between a heat source and said support a screening refractory element which encloses said support and is formed with at least one slit extending substantially over the entire length of the screening element.

13. The method defined in claim 12 wherein said screening element is formed with a plurality of slits having the same widths.

14. The method defined in claim 12 wherein said element has a plurality of such slits with different widths.

15. The method defined in claim 12 wherein said element is formed with portions between slits of the same widths.

16. The method defined in claim 12 wherein said element is formed with portions between slits of different widths.

17. The method defined in claim 12 wherein said element is formed with portions between slits of different thicknesses.

18. The method defined in claim 12 wherein said element is formed between slits of different shapes.

19. The method defined in claim 12 wherein said element is formed with portions between slits of different thicknesses and shapes.

* * * * *